Dec. 7, 1965   G. A. KLAFFKY   3,221,934
REMOTE PRICE SETTING SYSTEM
Filed July 1, 1963   3 Sheets-Sheet 1
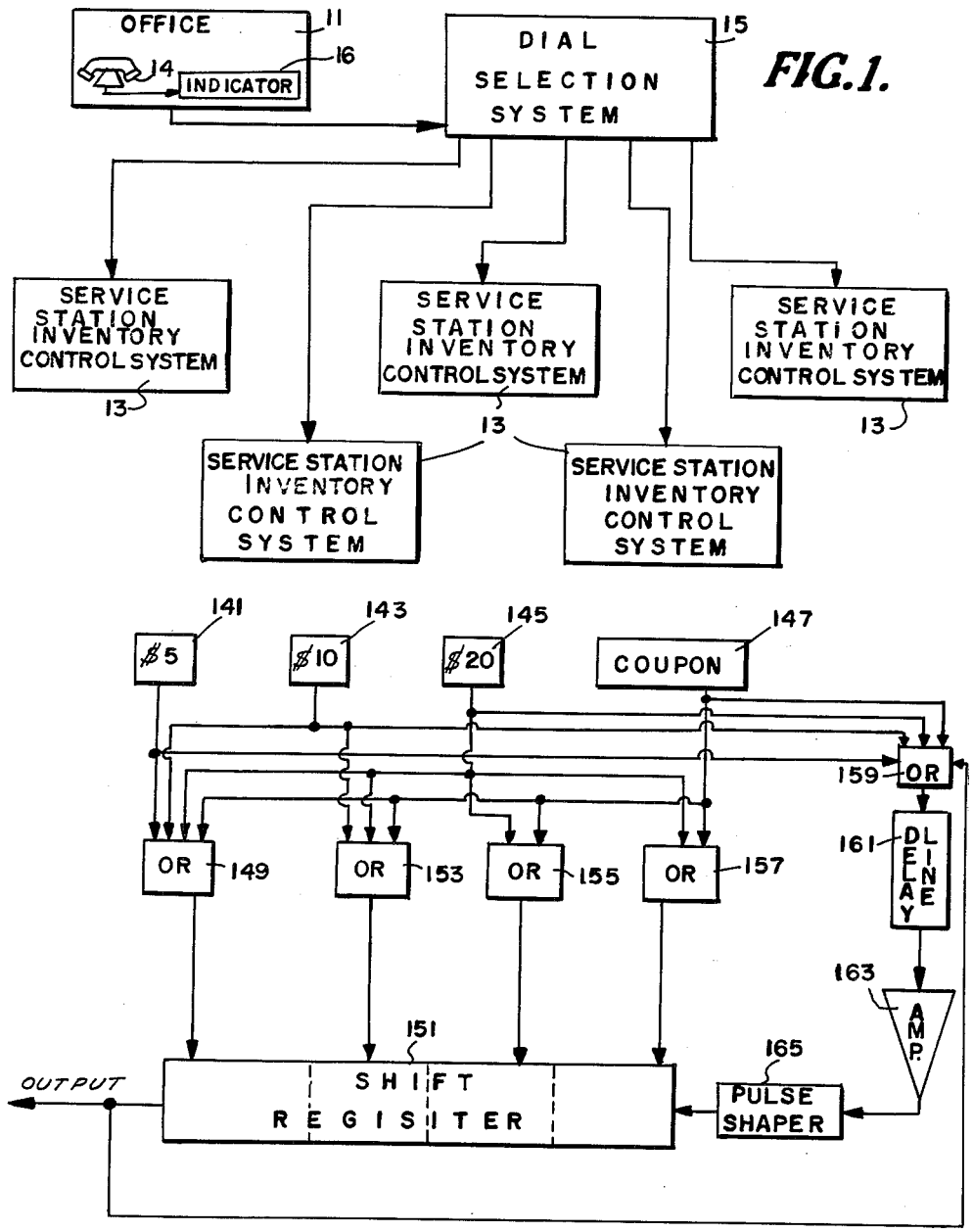

Dec. 7, 1965  G. A. KLAFFKY  3,221,934
REMOTE PRICE SETTING SYSTEM
Filed July 1, 1963  3 Sheets-Sheet 2

3,221,934
REMOTE PRICE SETTING SYSTEM
George A. Klaffky, Huntington, N.Y., assignor to Socony
Mobil Oil Company, Inc., a corporation of New York
Filed July 1, 1963, Ser. No. 292,051
24 Claims. (Cl. 222—26)

This invention relates to a remote price control system, and more particularly to a gasoline inventory control system in which the price of the gasoline in inventory at a service station can be selectively varied from a remote point.

In the copending application Serial No. 228,156, entitled Inventory Control System invented by George A. Klaffky and filed on October 3, 1962, there is described a gasoline service station inventory control system, in which only that part of the gasoline in the gasoline service station storage tanks which has been paid for by the service station operator is made available to the dispensing pumps of the service station. The inventory control system as described in the copending application is equipped with a paper currency validating machine and the operator of the service station can only dispense as much gasoline as he has paid for by inserting paper currency into the currency validating machine. For example, if the service station operator inserts $50 into the currency validating machine, then he can dispense from the service station pumps $50 worth of gasoline at the price prevailing at the time the gasoline is dispensed as set by a price control means at the service station. Inventory control systems are used because they permit more economical deliveries of large amounts of gasoline to be made to service stations without advancing credit or requiring payment for the entire delivery.

In accordance with the present invention, the price of the gasoline to the service station operator as it is dispensed from the dispensing pumps of the service station can be selectively varied from a remote point and in particular over a telephone line. In accordance with the present invention, the telephone number assigned to the inventory control system is dialed from a central office. After this number is dialed, two numbers which set the price of the gasoline of regular grade are dialed and then two additional numbers which set the price of the premium grade gasoline are dialed. In this manner the price of gasoline already stored in the storage tanks of the service station can be easily varied from a remote point, thus facilitating rapid price change of the gasoline stored in controlled inventory at widely scattered service stations to meet competitive conditions. With the system of the present invention, many price changes can be made even in a single day.

Accordingly, an object of the present invention is to provide for remote price setting in an inventory control system.

Another object of the present invention is to facilitate rapid price changes in inventory control systems at widely scattered locations.

A further object of the present invention is to provide a remote price setting system.

A still further object of the present invention is to provide a remote price seting system making use of conventional telephone interconnecting equipment.

Further objects and advantages of the present invention will become readily apparent as the following detailed description of the invention unfolds and when taken in conjunction with the drawings, wherein:

FIG. 1 is a block diagram illustrating the overall system of the invention;

FIG. 5 is a block diagram of the currency validator used in the inventory control system.

Figure 3:
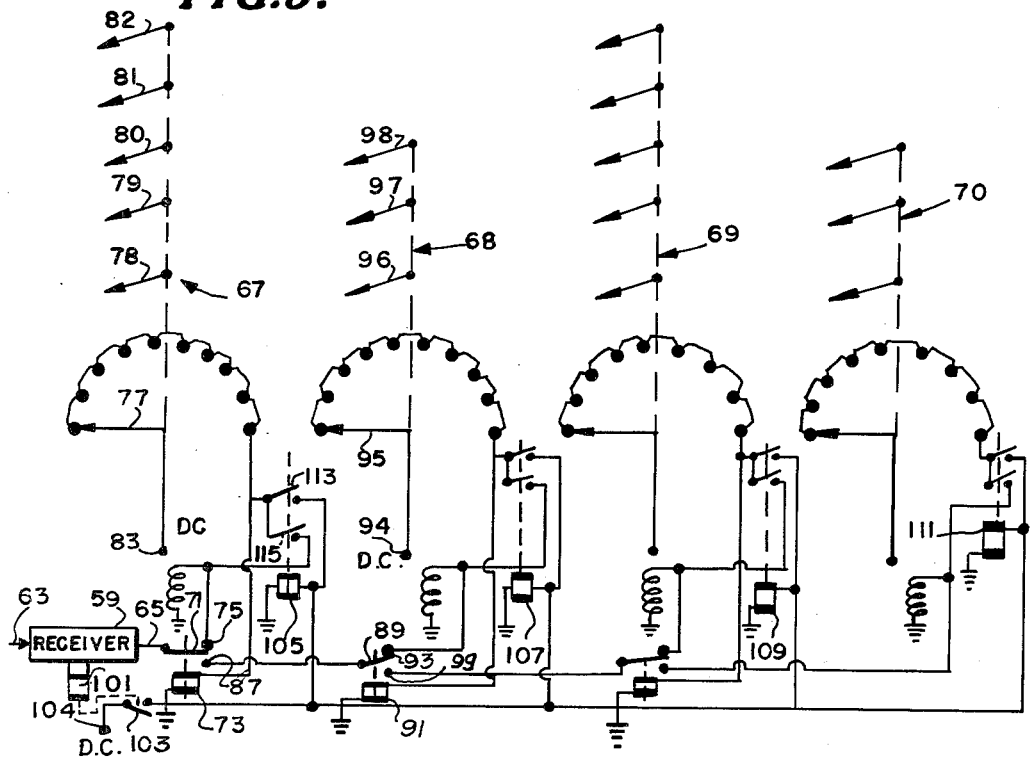
FIG. 3 is a circuit diagram illustrating how the price is remotely set at an inventory control system.

As shown in FIG. 1, the central office for the system is designated by the reference number 11. From the central office any one of a large number of inventory control systems at widely dispersed gasoline service stations 13 can be dialed. When the inventory control system at one of the service stations 13 is dialed from the central office, a direct telephone wire connection is provided between the inventory control system at the selected service station and the central office. The dial system for selecting any one of a large number of service stations and providing a telephone line connection between the inventory control system of the selected service station and the central office is a conventional telephone dial selection system 15. There is provided at the central office 11 a conventional telephone dial set 14 by means of which the dialing operation is carried out. In the preferred embodiment of the invention, the interconnecting telephone lines and the dial selection system is existing equipment of the telephone utility company serving the area. Accordingly, the system of the present invention can be used without the expense of providing interconnecting lines and the dial selection system. After one of the service stations 13 has been selected by dialing from the office 11, two additional digits are dialed at the office 11. These two additional digits set the price of the regular grade gasoline in inventory at the selected service station. This price is the price that the owner or operator of the service station has to pay for the gasoline as he dispenses it. Two additional digits are then dialed from the central office 11 and these two additional digits set the price of the premium grade gasoline in inventory at the selected service station. In this manner the price of gasoline stored in inventory in widely dispersed service stations 13 can be controlled from a remote office 11 and price variation at the individual service stations can be quickly and easily achieved. An indicator 16 is provided at the central office 11 to receive the dial pulses from the dial set 14. The indicator 16 will visually display to the attendant at the office 11 the dialed telephone number and the four additional digits setting the price of regular and premium grade gasoline.

In the preferred embodiment of the invention, the inventory control system at each different station has a different telephone number so that the prices at each service station may be set individually to meet competitive conditions. However, it is contemplated within the scope of the invention that the inventory control systems at a plurality of service stations would have the same number so that the price would be set at this plurality of stations simultaneously from the central office 11.

Figure 2:
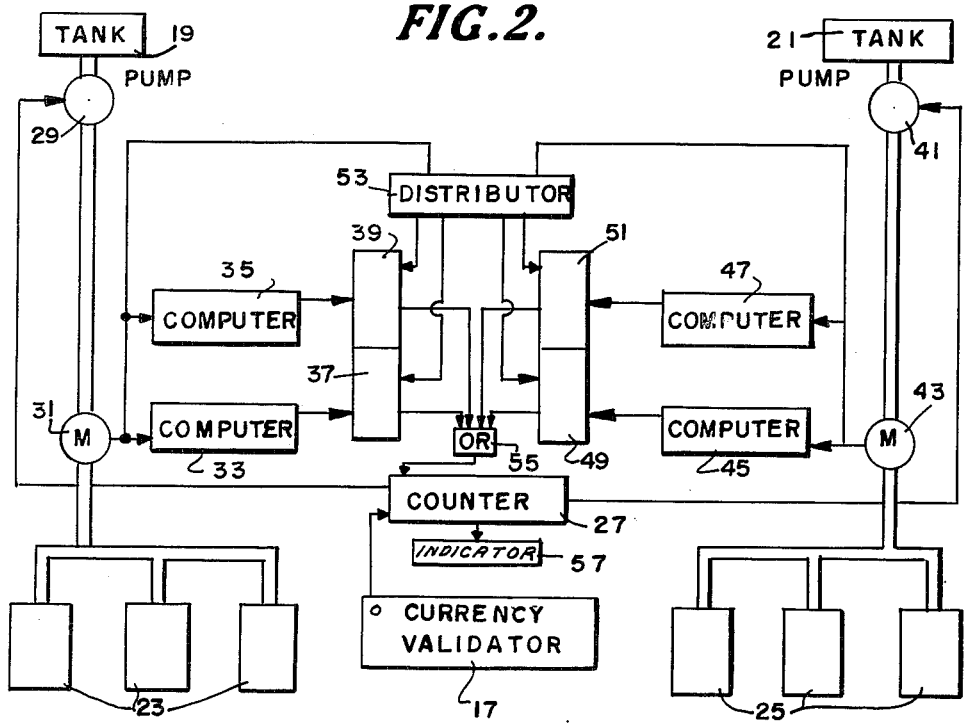
FIG. 2 is a block diagram of the inventory control system in which the price can be set remotely in accordance with the present invention.

FIG. 2 illustrates an inventory control system at one of the service stations 13. Such an inventory control system will be provided at each of the service stations 13. In the inventory control system shown in FIG. 2, the service station operator inserts paper currency into a currency calidator 17. The operator may insert $5, $10 or $20 bills into the currency validator 17. Regular gasoline stored in the storage tank 19 and premium gasoline stored in the storage tank 21 will then be made available through the dispensing pumps 23 and 25 to be dispensed therefrom. Special coupons based on credit card sales can also be inserted into the currency validator to make the gasoline stored in the tanks 19 and 21 available to the dispensing pumps 23 and 25. Only as much gasoline as has been paid for by the insertion of paper currency or coupons into the currency validator 17 can be dispensed from the dispensing pumps 23 and 25 and when the service station operator has dispensed this much gasoline, he will be unable to dispense any more until he inserts more paper currency or coupons into the currency validator 17. The price of the gasoline charged to the service station operator as he dispenses it is set from the central office 11 as described with reference to FIG. 1.

When paper currency or a coupon is inserted into the currency validator 17, the currency validator 17 applies pulses to a counter 27, which counts the pulses applied from the currency validator 17, counting in a forward direction. When a $5 bill is inserted into the currency validator 17, the currency validator 17 will apply one pulse to the counter 27. When a $10 bill is inserted into the currency validator 17, the currency validator will apply two pulses to the counter 27, and when a $20 bill is inserted into the currency validator 17, the currency validator will apply four pulses to the counter 27. Thus the count registered by the counter 27 will be increased by an amount proportional to the amount of currency inserted into the currency validator 17, with each increment of the registered count representing $5.

The regular grade gasoline stored in the tank 19 can be pumped by a pump 29 through a meter 31 to the dispensers 23, which can then dispense the regular grade gasoline. Each time a gallon of gasoline passes through the meter 31 it applies a pulse to a computer 33 and a computer 35. A price per gallon is set in the computer 33, which price is the lowest contemplated price for regular grade gasoline to be charged to the service station operator during a given period. This price can be varied manually at the service station. The computer 33, in response to the pulses received from the meter 31, computes when $5 worth of gasoline at the price set in the computer 33 has been dispensed, and each time $5 worth of gasoline at this price has been dispensed, the computer 33 applies a pulse to a buffer storage means 37. The computer 35 has a price set therein by dialing from the central office 11 and this price is the amount to be charged to the service station operator over the basic price set in the computer 33. The price charged to the service station operator will be the sum of the prices set in the computers 33 and 35. Thus if the basic price, which is the lowest price predicted for the given period, is 11¢ and the price to be charged to the service station operator is 19.9¢, then the computer 33 will have a price of 11¢ set therein and the computer 35 will have a price of 8.9¢ set therein. The computer 35, in response to the pulses from the meter 31, computes each time $5 worth of gasoline at the price set therein has passed through the meter 31 and each time $5 worth of gasoline at the price set in the computer 35 passes through the meter 31, the computer 35 applies a pulse to a buffer storage means 39. Thus the total number of pulses applied to the buffer storage means 37 and 39 by the computers 33 and 35 represents the value of the gasoline flowing through the meter 31 at the price charged to the operator of the service station as determined by the sum of the prices set in computers 33 and 35 with each pulse being worth $5. A pump 41 can pump the premium gasoline stored in the tank 21 through a meter 43 to the dispensers 25 to be dispensed thereby. The meter 43 applies a pulse for each gallon of gasoline passing therethrough to a computer 45 and to a computer 47. The computer 45, like the computer 33, has a price set manually therein and the price set in the computer 45 is the lowest contemplated price to be charged to the operator of the service station for premium gasoline during a given period. The price set in the computer 47, like that set in the computer 35, is set remotely by telephone from the central office 11. The price charged to the operator of the service station for premium gasoline is equal to the price set in the computer 45 plus the price set into the computer 47. The computer 45, in response to the pulses from the meter 43, applies a pulse to a buffer storage means 49 each time $5 worth of gasoline at the price set in the computer 45 passes through the meter 43. The computer 47, in response to the pulses from the meter 43, applies a pulse to the buffer storage means 51 each time $5 worth of gasoline at the price set in the computer 47 passes through the meter 43. Thus the total number of pulses applied to the buffer storage means 49 and 51 will represent the total value of the gasoline passing through the meter 43 at the price charged to the service station operator as represented by the sum of the prices set in the computers 45 and 47 with each applied pulse representing $5 worth of gasoline. Accordingly the total number of pulses applied to the buffer storage means 37, 39, 49 and 51 from the computers 33, 35, 45 and 47 will represent the total value of gasoline passing through the meters 31 and 43 at the price charged to the service station operator with each pulse representing $5.

Each of the buffer storage means 37, 39, 49 and 51 will store a pulse applied from the computers 33, 35, 45 and 47, respectively, until such pulse is read out. Each time the meter 31 or the meter 43 produces an output pulse, it actuates a distributor 53 which, in response to being actuated, reads out the buffer storage means 37, 39, 49 and 51 in sequence. When any one of the buffer storage means 37, 39, 49 or 51 is read out and such buffer storage means has a pulse stored therein, then such buffer storage means will produce an output pulse and will no longer store a pulse. If the buffer storage means does not store a pulse when it is read out, then the buffer storage means will not produce an output pulse and will remain in the condition of not storing a pulse. Each time an output pulse is produced from one of the buffer storage means 37, 39, 49 or 51, the output pulse will pass through an OR gate 55 to the counter 27 and cause it to count in a negative direction by one increment. The function of the distributor 53 and the buffer storage units 37, 39, 49 and 51 is to prevent pulses from being applied simultaneously from two or more of the computers 33, 35, 45 and 47 to the counter 27. Thus it will be seen that the total number of pulses applied to the counter 27 will represent the value of the gasoline passing through the meters 31 and 43 at the price charged to the service station operator, with each pulse representing $5 worth of gasoline. Accordingly the count registered by the counter 27 will be continuously decreased in accordance with the value of the gasoline passing through the meters 31 and 43 with each increment of decrease representing $5 worth of gasoline. Since the currency validator 17 increases the count registered by the counter 27 in accordance with the paper currency or coupons inserted therein, the total count registered by the counter 27 will represent the amount of gasoline stored in the storage tanks 19 and 21 that the service station operator has paid for by inserting paper currency or coupons into the currency validator 17. When the count registered in the counter 27 reaches zero, indicating that all of the gasoline that the service station operator has paid for has been dispensed, the counter 27 disables the pumps 29 and 41 by interrupting the electrical power energizing these pumps. Thus the service station operator can only dispense as much gasoline from the pumps 23 and 25 as he has paid for by inserting paper currency or coupons into the currency validator 17. An indicator 57 is provided to continuously indicate the count registered in the counter 27, thus indicating to the service station operator the amount of gasoline available to be dispensed by him. This indication will not be precisely accurate because of the fact that the computers 33, 35, 45 and 47 may contain computations that part of $5 worth of gasoline has passed through the meters 31 and 43. Because of this fact, the indicator 57 can indicate almost $20 more gasoline available to be dispensed than is actually available. On the average the indicator 57 will indicate about $10 more gasoline available to be dispensed than there is actually available.

The basic prices set into the computers 33 and 45 will be reset at regular intervals. The basic prices for both regular and premium gasoline will be set at the predicted lower limits for the prices of regular and premium gasoline to be charged to the service station operator during the interval before the next regular time for resetting the basic price. If the price to be charged to the service station operator should drop below the set basic price or should exceed it by an amount greater than 9.9¢, then a special resetting of the basic price would have to be made.

FIG. 3 illustrates the price setting system of the inventory control system at one of the service stations 13. The incoming telephone line in FIG. 3 is designated by the reference number 63. When the inventory control system is selected by dialing from the central office 11, the ringing signal will be sent over the line 63 to this system, which ringing signal will be applied to a receiver 59. The receiver 59, in response to receiving the ringing signal, will connect the incoming line 63 to a line 65. After the connection is made in this manner to the selected inventory control system, the prices of regular and premium grade gasoline are set in the computers 35 and 47 by dialing. This is accomplished by first dialing the price for regular grade gasoline set in the computer 35 and then dialing the price of the premium grade gasoline set in the computer 47. The attendant at the central office 11 dials four additional digits after he has dialed the number of the selected service station. The first two digits of these four additional digits set the price in the computer 35 and the second two digits set the price in the computer 47. The first dialed digit after the telephone number is dialed sets the price in cents in the computer 35 and the second dialed digit sets the price in tenths of cents. The third dialed digit after the dialing of the telephone number sets the price in cents in the computer 47 and the fourth dialed digit sets the price in tenths of cents in the computer 47. For example, if the price to be set in the computer 35 is 5.7¢ and the price to be set in the computer 47 is 6.3¢, then the attendant at the central office 11 dials in succession the digits 5, 7, 6 and 3 after dialing the telephone number for the inventory control system at the selected service station. As each digit of the four additional digits is dialed, a pulse train is sent from the office 11 over the line 63 to the line 65, which pulse train will have a number of pulses equal to the digit dialed. The first pulse train coming over line 65 will be applied to the stepping input of a stepping switch 67, which is one of four stepping switches 67 through 70 at the inventory control system. When the first pulse train is applied to the stepping input of the stepping switch 67, all of the stepping switches 67 through 70 will be in their home positions, which are the positions illustrated in FIG. 3. The placing of the switches 67 through 70 in their home positions is done in response to receiving the ringing signal by circuitry to be described below. The first pulse train applied over line 65 passes to the stepping input of the switch 67 through the arm 71 of a relay 73, which at this time will not be energized. When the relay 73 is not energized, the arm 71 will engage a contact 75 to apply the pulse train to the stepping input of the stepping switch 67. As a result, the first pulse train coming in over line 65 causes the stepping switch 67 to step a number of positions equal to the number of pulses in the first pulse train, or in other words equal to the first digit dialed from the office 11 after the telephone number of the inventory control system has been dialed. The stepping switch 67 has six movable arms 77 through 82, each of which engages a switch contact at each of the eleven positions of the stepping switch. The contacts engageable by the arm 77 at all of the positions of the stepping switch 67 except the home position are connected together and to one side of the relay 73, the other side of which is grounded. D.C. power is applied to the movable arm 77 from a terminal 83 so that after the stepping switch 67 has been advanced in response to the applied pulse train, the D.C. power at terminal 83 will be applied over the arm 77 to the relay 73 and energize the relay 73. The relay 73 will not be energized until the entire pulse train has been applied to the stepping input of the stepping switch 67 because the relay 73 is slow acting and none of the contacts engageable by the arm 77 will be engaged while the stepping operation is going on for a sufficiently long period for the relay 73 to become energized. As a result the relay 73 will not become energized and actuate the relay arm 71 until the stepping switch 67 has stepped the number of steps equal to the number of pulses in the first pulse train. After this pulse train has been applied, and before the next pulse train representing the next dialed digit comes over the line 65, the relay 73 will become energized and cause the arm 71 to disengage the contact 75 and engage a contact 87. As a result the next pulse train on line 65 representing the next dialed digit is applied from the line 65 over the relay arm 71 to a relay arm 89 of a relay 91. At this time the relay 91 will not be energized and the arm 89 will engage a contact 93 which is connected to the stepping input of the stepping switch 68. As a result the next train of pulses representing the second dialed digit after the telephone number of the inventory control system has been dialed will be applied to the stepping input of the stepping switch 68. In response to receiving this pulse train, the stepping switch 68 will step a number of positions equal to the dialed digit. The stepping switch 68, like the stepping switch 67, has a home position and ten other positions. It has four movable arms 95 through 98, each of which engages a different contact at each of the positions of the stepping switch. The contacts engaged by the arm 95 in each of the positions of the switch 68 except the home position are connected together and to one side of the relay 91, the other side of which is grounded. The arm 95 is connected to a source of D.C. power applied at a terminal 94. The relay 91, like the relay 73, is slow acting and will not be energized from the source at terminal 94 until the switch 68 stops stepping, at which time the relay 91 will be energized and disengage its relay arm 89 from the contact 93 and engage it with a contact 99. By similar circuitry, the third train of pulses on line 65, representing the third dialed digit after the telephone number of the inventory control system has been dialed, causes the stepping switch 69 to step a number of positions equal to this dialed digit and the fourth train of pulses is applied to the stepping input of the stepping switch 70, causing the stepping switch 70 to advance a number of positions equal to the fourth dialed digit after the telephone number of the inventory control system has been dialed. Thus the stepping switches 67 through 70 will be positioned in accordance with the four digits dialed after the telephone number of the inventory control system is dialed.

The receiver 59, in addition to connecting the line 63 to the line 65 in response to the ringing signal, also momentarily energizes a relay 101 which momentarily closes its contacts 103. D.C. power at a terminal 104 then passes through the contact 103 to energize relays 105, 107, 109 and 111, each of which then closes its contacts. Each of the relays 105, 107, 109 and 111 has two sets of contacts. The contacts of the relay 105 are designated by the reference numbers 113 and 115. If, when the contact 113 is closed as a result of the energization of the relay 105, the stepping switch 67 is in any other position than its home position, then the relay 105 will be energized by a holding circuit from the terminal 83 through the switch arm 77 and the contact 113. Thus the relay 105 will remain energized after the contact 103 opens following the momentary energization of the relay 101 if the stepping switch 67 is in any other position than its home position. As a result D.C. power will be applied from the terminal 83 through the arm 77 through the closed contact 115 of the relay 105 to the stepping input of the stepping switch 67. The stepping switch 67 will then step as long as the contact 115 remains closed because each time the arm 77 steps off of one of its contacts, it interrupts the current to the stepping input and each time it engages one of its contacts it applies current to the stepping input so that pulses are applied to the stepping input of the stepping switch 67. Relays 105, 107, 109 and 111 are slow release relays so the relay 105 will remain energized through its holding circuit while the stepping switch is being stepped in this manner even though the switching arm 77 is opening and closing its holding circuit. The stepping switch 67 will continue to step in this manner until it gets back to its home position, at which position no current is applied to the stepping input of the stepping switch or to the relay 105. Thus the stepping switch 67 will stop stepping at its home position and the relay 105 is deenergized. In this manner the stepping switch 67 is brought back to its home position in response to the ringing signal applied to the receiver 59. In a similar manner the relay 107 brings the stepping switch 68 back to its home position, the relay 109 brings the stepping switch 69 back to its home position and the relay 111 brings the stepping switch 70 back to its home position. Therefore each of the switches 67 through 70 will be at its home position prior to the application of the trains of pulses from line 65 to the stepping switches. The attendant at the office 11 should wait for a short moment prior to dialing the price setting digits after dialing the telephone number of the selected inventory control system to give the stepping switches 67 through 70 time to step back to their home positions.

By positioning the stepping switches 67 and 68 in the manner described above, the price is set into the computer 35 and by positioning the stepping switches 69 and 70 as described above the price is set into the computer 47.

Figure 4:
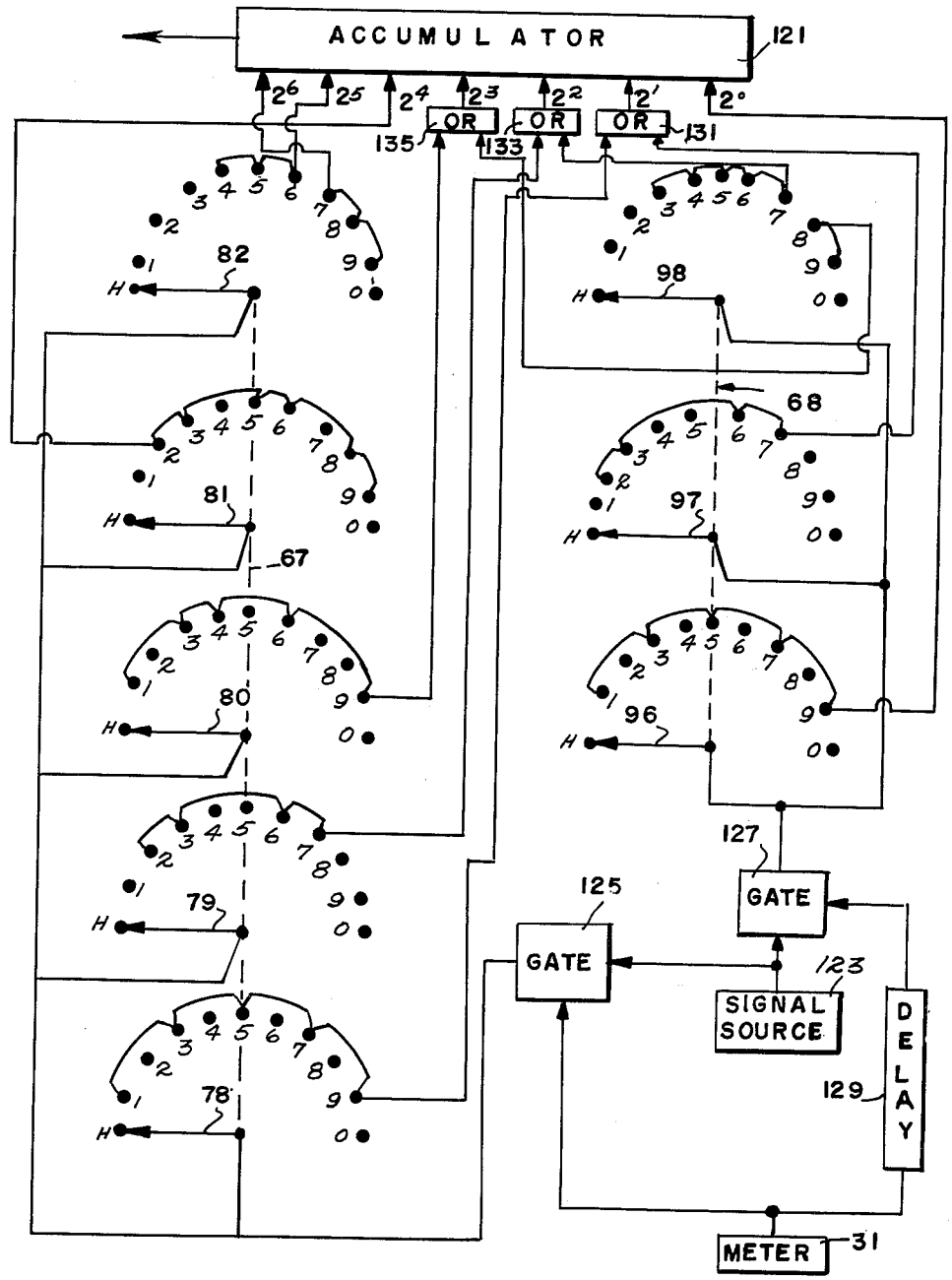
FIG. 4 is a circuit diagram illustrating a computer used in the inventory control system.

FIG. 4 illustrates the details of the computer 35 and how the positioning of the switches 67 and 68 sets the price in the computer 35. As shown in FIG. 4, the computer 35 comprises an accumulator 121 to which binary signals are applied in parallel form. These binary signals are applied to the accumulator 121 each time the meter 31 produces an output pulse and represent the price per gallon of gasoline as set into the computer 35. These binary signals are encoded by the switches 67 and 68. The accumulator 121 functions to add the binary numbers represented by the applied binary signals to the number stored therein and store the resulting sum until the sum exceeds the capacity of the accumulator. Each time the capacity of the accumulator 121 is exceeded, the accumulator produces an output pulse and stores a number equal to the amount that the sum exceeds the capacity of the accumulator. By properly selecting the capacity of the accumulator, it can be made to produce an output pulse whenever $5 worth of gasoline has passed through the meter 31 as determined by the price set by the stepping switches 67 and 68. To simplify the system, the position of the switch 68 is encoded as units instead of tenths and the position of the switch 67 is encoded as tens instead of units. Thus in the encoding of the price set by the switches 67 and 68, the price is multiplied by ten. Because of this multiplication, the capacity of the accumulator must be five thousand instead of five hundred for producing an output pulse for every $5 worth of gasoline.

A signal source 123 continuously applies a signal to gates 125 and 127. When the gate 125 is enabled, the signal from the source 123 passes through to the arms 78 through 82 of the switch 67. The signal is then passed to the proper inputs of the accumulator 121 to correctly encode the position of the switch 67. When the gate 127 is enabled, a signal from the source 123 passes through to the arms 96 through 98 of the switch 68. The signal is then passed through to the proper inputs of the accumulator 121 to correctly encode the position of the switch 68. The pulses produced by the meter 31 are applied directly to the gate 125 to enable it and through a delay line 129 to enable the gate 127. Thus each time the meter 31 produces an output pulse representing the flow of one gallon of gasoline, binary signals representing the position of the switches 67 and 68 are applied to the accumulator. As pointed out above, the position of the switches 67 and 68 represent the price set into the computer 35, and this price is encoded in binary form multiplied by ten. Thus each time a gallon of gasoline passes through the meter 31, the price of the gasoline in cents multiplied by ten is applied to the accumulator 121 to be added to the contents thereof. Thus when the sum stored in the accumulator 121 reaches 5,000, $5 worth of gasoline will have passed through the meter 31. In this manner the accumulator 121 will compute the value of the gasoline passing through the meter 31 at the price set by the switches 67 and 68 and produce an output pulse for each $5 worth. The delay line 129 prevents the encoded signals from the switch 68 from being applied to the accumulator 121 simultaneously with the encoded signals from the switch 67.

To provide the desired encoding from the switch 67, the contacts engageable by the arm 78 at the first, third, fifth, seventh and ninth positions are connected together and through an OR gate 131 to the $2^1$ binary input of the accumulator 121; thec ontacts engageable by the arm 79 at the second, third, sixth and seventh positions are connected together and through an OR gate 133 to the $2^2$ binary input of the accumulator 121; the contacts engageable by the arm 80 at the first, third, fourth, sixth and ninth positions are connected together and through an OR gate 135 to the $2^3$ binary input of the accumulator 121; the contacts engageable by the arm 81 in the second, third, fifth, sixth, eighth and ninth positions are connected together and to the $2^4$ binary input of the accumulator 121; the contacts engageable by the arm 82 in the fourth, fifth and sixth positions are connected together and to the $2^5$ binary input of the accumulator 121; and the contacts engageable by the arm 82 in the seventh, eighth and ninth positions are connected together and to the $2^6$ binary input of the accumulator 121. In this manner the positions 1 through 9 of the switch 67 are encoded as binary signals representing 10, 20, 30, 40, 50, 60, 70, 80 and 90, respectively. To encode the positions of the switch 68 as units, the contacts engageable by the arm 96 in the first, third, fifth, seventh and ninth positions are connected together and to the $2^0$ binary input of the accumulator 121; the contacts engageable by the arm 97 in the second, third, sixth and seventh positions are connected together and through the OR gate 131 to the $2^1$ binary input of the accumulator 121; the contacts engageable by the arm 98 in the third, fourth, fifth, sixth and seventh positions are connected together and through the OR gate 133 to the $2^2$ binary input of the accumulator 121; and the contacts engageable by the arm 98 in the eighth and ninth positions are connected together and through the OR gate 135 to the $2^3$ binary input of the accumulator 121. In this manner the position of the stepping switch 68 is encoded in binary form with the positions 1 through 9 being encoded as the binary numbers 1 through 9.

The stepping switches 69 and 70 set the price in the computer 47 in the same manner as the stepping switches 67 and 68 set the price in the computer 35 and the computer 47 operates to produce an output pulse each time $5 worth of gasoline flows through the meter 43 in the same manner as the computer 35 operates in response to the meter 31. The computers 33 and 45 are also similar to the computer 35 except that instead of using stepping switches, manually positionable switches are used to set the price.

As shown in FIG. 5, the currency validator 17 comprises a $5 bill detector 141, a $10 bill detector 143, a $20 bill detector 145 and a coupon detector 147. The $5 bill detector 141 will produce an output pulse whenever a $5 bill is inserted therein. Similarly the $10 bill detector 143 will produce an output pulse whenever a $10 bill is inserted therein, the $20 bill detector 145 will produce an output pulse whenever a $20 bill is inserted therein, and the coupon detector 147 will produce an output pulse whenever a valid coupon is inserted therein. Any output pulse produced by the $5 bill detector 141 is applied through an OR gate 149 to the last stage of a four stage shift register 151 and stored therein. Any output pulse produced by the $10 bill detector 143 is applied through the OR gate 149 to the last stage of the shift register 151 to be stored therein, and through an OR gate 153 to be stored into the second to last stage of the shift register 151. Whenever the $20 bill detector 145 produces an output pulse, it applies this pulse through the OR gate 149 to be stored in the last stage of the shift register 151, through the OR gate 153 to be stored in the second to last stage of the shift register 151, and through OR gates 155 and 157 to be stored in the remaining two stages of the shift register 151. In the preferred embodiment of the invention, the coupons which are to be inserted into the currency validator are worth $20. Accordingly, any output pulse produced by the coupon detector 147, like that from the $20 bill detector 145, is applied through the OR gates 149, 153, 155 and 157 to be stored in all four stages of the shift register 151. Whenever any one of the detectors 141, 143, 145 or 147 produces an output pulse, it is applied through an OR gate 159 and a delay line 161 to the input of an amplifier 163. After being amplified by the amplifier 163 the pulse is applied to a pulse shaper 165, which shapes the pulse and applies it to the shift input of the shift register 151. As a result the shift register 151 will be shifted whenever a pulse is stored in one or more stages of the shift register 151 from one of the detectors 141, 143, 145 and 147. The shifting occurs after a short delay provided by the delay line 161. When the shift register 151 is shifted, any pulses stored therein will shift one stage to the left and the pulse stored in the last stage is shifted out of the shift register to produce an output pulse from the shift register. An output pulse produced by the shift register is applied through the OR gate 159 and the delay line 161 to the input of the amplifier 163 where it is amplified and applied to the pulse shaper 165, which shapes the pulse and applies it to the shift input of the shift register 151. As a result the shift register will be shifted again a short delay after each output pulse is produced by the shift register 151. When all the pulses have been shifted out of the shift register 151, the shift register 151 will stop producing output pulses. Accordingly the shift register 151 will produce one output pulse whenever the $5 bill detector 141 produces an output pulse in response to receiving a $5 bill, will produce two output pulses whenever the $10 bill detector 143 produces an output pulse in response to receiving a $10 bill, will produce four output pulses whenever the $20 bill detector 145 produces an output pulses whenever the $20 bill detector 145 produces an output pulse in response to receiving a $20 bill, and will produce four output pulses whenever the coupon detector 147 produces an output pulse in response to receiving a valid coupon. The output pulses from the shift register 151 are the output pulses from the currency validator 17 applied to the counter 27. Thus the currency validator 17 will produce one output pulse in response to a $5 bill, two output pulses in response to a $10 bill and four output pulses in response to either a $20 bill or a valid coupon.

Thus there is provided a remote price setting system for controlling the price of gasoline in widely dispersed inventory control systems, which price setting system can quickly and easily vary the price at any one of the inventory control systems.

In the above described system the amount of gasoline dispensed from the dispensers is determined by the meters 31 and 43. Alternatively individual meters on each of the dispensers 23 and 25 could be used. Also the remote price setting system of the present invention is not limited to an inventory control system in which the inventory control is achieved by means of a currency validating machine, but is also applicable to other types of inventory control systems. Many other modifications may be made to the above described specific embodiment of the invention without departing from the spirit and scope of the invention, which is defined in the appended claims.

What is claimed is:

1. A dispensing system comprising a plurality of widely dispersed dispensing stations, storage means at each of said dispensing stations to store material, dispensing means at each of said dispensing stations to dispense material from the storage means at such dispensing station, computer mean for each of said dispensing stations to compute the total cost of material dispensed from the dispensing means at such station at a selectively variable price per unit of said material set into such computer means, and means positioned at a location remote from said dispensing stations to select said selectively variable price set into each of said computer means.

2. A dispensing system as recited in claim 1 wherein said means positioned at said remote location sends electrically encoded signals to said computer means to select said selectively variable price.

3. A dispensing system comprising a dispensing station, storage means at said dispensing station to store material, dispensing means at said dispensing station to dispense material from said storage means, computer means to compute the total cost of material dispensed from said dispensing means at a selectively variable price per unit of said material set into said computer means, and means positioned at a location remote from said dispensing station to select said selectively variable price set in said computer means, said means positioned at said remote location including telephone lines interconnecting said remote location with said dispensing station and sending electrically encoded signals to said computer means over said telephone lines to select said selectively variable price.

4. A dispensing system as recited in claim 3 wherein said means positioned at said remote location includes a dialing means at said remote location to send pulses over said telephone lines to said dispensing station and said computer means includes means responsive to pulses sent over said telephone lines to set said selectively variable price.

5. A dispensing system comprising a plurality of widely dispersed dispensing stations, storage means at each of said dispensing stations to store material, dispensing means at each of said dispensing stations to dispense material from the storage means at such dispensing station, computer means at each of said dispensing stations to compute the total cost of the material dispensed from the dispensing means at such dispensing station at a selectively variable price per unit of said material set into such computer means, and means positioned at a location remote from said dispensing stations to select said selectively variable price set into each of said computer means.

6. A dispensing system comprising a plurality of widely dispersed dispensing stations, storage means at each of said dispensing stations to store material, dispensing means at each of said dispensing stations to dispense material from the storage means at such station, computer means for each of said stations to compute the total cost of material dispensed from the storage means at such station at a selectively variable price per unit of said material set into said computer means, a means positioned at a location remote from each of said dispensing stations to select any one of said dispensing stations and select said selectively variable price set into the computer means of the selected station.

7. A dispensing system as recited in claim 6 wherein said means positioned at said remote location sends electrically encoded signals to the computer at the selected station to select said selectively variable price.

8. A dispensing system as recited in claim 7 wherein said means positioned at said remote location includes telephone lines interconnecting said remote location with said dispensing stations.

9. A dispensing system as recited in claim 8 wherein said means positioned at said remote location includes a dialing means at said remote location to send pulses over said telephone lines to select one of said dispensing stations and to send pulses over said telephone lines to the selected dispensing station, and each of said computer means includes means responsive to pulses received over said telephone lines to set said selectively variable price.

10. An inventory control system comprising a plurality of widely dispersed dispensing stations, storage means at each of said dispensing stations for storing material, dispensing means at each of said dispensing stations to dispense material made available thereto from the storage means at such dispensing station, means at each of said dispensing stations to make material in the storage means at such dispensing station available to the dispensing means at such dispensing station up to a predetermined total cost of said material at a selectively variable price per unit of said material, and means positioned at a location remote from said dispensing stations to select said selectively variable price.

11. An inventory control system as recited in claim 10 wherein said means positioned at said remote location sends electrically encoded signals to said dispensing stations to select said selectively variable price.

12. An inventory control system comprising a dispensing station, storage means at said dispensing station for storing material, dispensing means at said dispensing station to dispense material made available thereto from said storage means, means to make material in said storage means available to said dispensing means up to a predetermined total cost of said material at a selectively variable price per unit of said material, and means positioned at a location remote from said storage means and said dispensing means to select said selectively variable price, said means positioned at said remote location including telephone lines interconnecting said remote location and said dispensing station and sending electrically encoded signals over said telephone lines to said dispensing station to select said selectively variable price.

13. An inventory control system as recited in claim 12 wherein said means positioned at said remote location includes a dialing means at said remote location to send pulses over said telephone lines to said dispensing station and said computer means includes means responsive to pulses sent over said telephone lines to set said selectively variable price.

14. An inventory control system comprising a dispensing station, storage means at said dispensing station for storing material, dispensing means at said dispensing station for dispensing material made available thereto from said storage means, currency validating means at said dispensing station to detect the insertion of paper currency therein, means to make material in said storage means available to said dispensing means up to the total cost of said material that has been paid for by the insertion of paper currency into said currency validating means at a selectively variable price per unit volume of said material, and means positioned at a location remote from said dispensing station to select said selectively variable price.

15. An inventory control system as recited in claim 14 wherein said means positioned at said remote location sends electrically encoded signals to said computer means to select said selectively variable price.

16. An inventory control system as recited in claim 15 wherein said means positioned at said remote location includes telephone lines interconnecting said remote location and said dispensing station.

17. An inventory control system as recited in claim 16 wherein said means positioned at said remote location includes a dialing means at said remote location to send pulses over said telephone lines to said dispensing station and said computer means includes means responsive to pulses sent over said telephone lines to set said selectively variable price.

18. A system comprising a plurality of widely dispersed dispensing stations, storage means at each of said dispensing stations for storing material, dispensing means at each of said dispensing stations to dispense material made available thereto from said storage means, means at each of said stations to make material in the storage means at such station available to the dispensing means at such station up to a predetermined total cost of said material at a selectively variable price per unit volume of said material, and means positioned at a location remote from said dispensing stations to select any one of said stations and select the selectively variable price at such station.

19. A system as recited in claim 18 wherein said means positioned at said remote location sends electrically encoded signals to the computer means at the selected station to select said selectively variable price.

20. A system as recited in claim 19 wherein said means positioned at said remote location includes telephone lines interconnecting said remote location with said dispensing stations.

21. A system as recited in claim 20 wherein said means positioned at said remote location includes a dialing means at said remote location to send pulses over said telephone lines to select one of said dispensing stations and to send pulses over said telephone lines to the selected dispensing station, and each of said computer means includes means responsive to pulses received over said telephone lines to set said selectively variable price.

22. A system comprising a plurality of widely dispersed stations, conveying means at each of said stations to move material in a continuous stream, computer means in each of said stations to compute the total cost of said material moving past a predetermined point at a selectively variable price per unit volume of said material set in said computer means, and means positioned remote from said stations to select any one of said stations and select the selectively variable price set in the computer means at such station.

23. In a gasoline inventory control system of the type in which large amounts of gasoline are stored at widely dispersed stations, the improvement wherein each station has dispensing means to dispense gasoline stored at such station and computer means to compute the total cost of the gasoline dispensed from such station at selectively variable prices, and wherein there are provided means at each station to control the amount of gasoline available to the station manager to be dispensed from such station in accordance with a cumulative total cost computed by said computer means of the gasoline dispensed from such station, and means positioned at a location remote from each of said dispensing stations to select said selectively variable price set into the computer means at each of said stations.

24. In an inventory control system of the type in which large amounts of material are stored at widely dispersed stations, the improvement wherein each of said stations as dispensing means to dispense the material stored at such station and computer means to compute the total cost of the material dispensed from such station at selectively variable prices, and wherein there are provided means at each station to control the amount of material available to the station manager to be dispensed from such station in accordance with a cumulative total cost computed by said computer means of the material dispensed from said station and means positioned at a location remote from each of said dispensing stations to select said selectively variable price set into the computer means at each of said stations.

References Cited by the Examiner

UNITED STATES PATENTS

| | | | |
|---|---|---|---|
| 2,247,480 | 7/1941 | Damon et al. | 194—66 |
| 2,323,374 | 7/1943 | Bugg | 222—26 X |
| 2,379,785 | 7/1945 | Bugg | 222—26 X |
| 2,455,210 | 11/1948 | Anderson | 40—52 X |
| 2,612,710 | 10/1952 | Fuller | 40—52 X |
| 2,634,845 | 4/1953 | Chapman et al. | 194—9 |
| 2,858,048 | 10/1958 | Harks | 222—2 X |
| 2,980,758 | 4/1961 | Goldwater et al. | 178—2 X |
| 2,995,229 | 8/1961 | West | 222—2 X |

LOUIS J. DEMBO, *Primary Examiner.*

UNITED STATES PATENT OFFICE
CERTIFICATE OF CORRECTION

Patent No. 3,221,934                      December 7, 1965

George A. Klaffky

It is hereby certified that error appears in the above numbered patent requiring correction and that the said Letters Patent should read as corrected below.

Column 9, lines 66 and 67, strike out "pulses whenever th $20 bill detector 145 produces an output"; column 10, line 24, for "mean" read -- means --.

Signed and sealed this 17th day of January 1967.

(SEAL)
Attest:

ERNEST W. SWIDER                      EDWARD J. BRENNER
Attesting Officer                      Commissioner of Patents